(12) United States Patent
Lang

(10) Patent No.: US 8,085,107 B2
(45) Date of Patent: Dec. 27, 2011

(54) TRANSMISSION MODULE

(75) Inventor: Martin Lang, Weisendorf (DE)

(73) Assignee: BIOTRONIK CRM Patent AG (CH)

( * ) Notice: Subject to any disclaimer, the term of this patent is extended or adjusted under 35 U.S.C. 154(b) by 79 days.

(21) Appl. No.: 12/698,211

(22) Filed: Feb. 2, 2010

(65) Prior Publication Data
US 2010/0194486 A1    Aug. 5, 2010

(30) Foreign Application Priority Data

Feb. 3, 2009   (DE) .......................... 10 2009 000 569

(51) Int. Cl.
*H03C 3/06*   (2006.01)

(52) U.S. Cl. ........ 332/127; 332/118; 332/123; 375/303; 455/110; 455/126

(58) Field of Classification Search .................. 332/100, 332/117, 118, 123, 124, 127; 375/272, 302, 375/303, 306, 309; 455/110, 114.2, 114.3, 455/126
See application file for complete search history.

(56) References Cited

U.S. PATENT DOCUMENTS

| | | | |
|---|---|---|---|
| 7,095,819 B2 * | 8/2006 | Bellaouar et al. ............. | 375/376 |
| 7,138,838 B2 | 11/2006 | Shibahara et al. | |
| 7,466,207 B2 | 12/2008 | Staszewski et al. | |
| 2006/0088126 A1 * | 4/2006 | Puma ............................ | 375/302 |
| 2008/0095269 A1 * | 4/2008 | Frantzeskakis et al. ...... | 375/302 |

OTHER PUBLICATIONS

McMahill, D.R., Sodini, Ch.G., A 2.5-mb/s GFSK 5.0-MB/s 4-FSK Automatically Calibrated Σ-Δ Frequency Synthesizer, *IEEE Journal of Solid-State Circuits*, vol. 37, No. 1, pp. 18-26 (2002).
Perrott, M.H., et al., A 27-mW CMOS Fractional-N Synthesizer Using Digital Compensation for 2.5-Mb/s GFSK Modulation, *IEEE Journal of Solid State Circuits*, vol. 32, No. 12, pp. 2048-2060, (1997).

* cited by examiner

*Primary Examiner* — Ryan Johnson
(74) *Attorney, Agent, or Firm* — Craig A. Fieschko, Esq.; DeWitt Ross & Stevens S.C.

(57) ABSTRACT

The invention relates to a transmission module for transmitting data in the form of useful digital signals by modulation of a carrier, determined by the useful signals, by means of frequency shift keying. The transmission module contains a PLL circuit with a voltage-controlled oscillator and a controllable frequency divider with a frequency divider control input. The transmission module is designed to induce direct frequency shift keying (DFSK) of the carrier signal by appropriate triggering of the frequency divider with at least two different frequency divider control signals, and it has a modulation data preprocessing unit, which is connected to the frequency divider control input and is designed to weight samples of the same polarity of the useful signals to be transmitted and to fine tune the frequency divider control signal with regard to the frequency deviation to be induced.

18 Claims, 5 Drawing Sheets

US 8,085,107 B2

TRANSMISSION MODULE

FIELD OF THE INVENTION

The invention relates to a transmission module suitable in particular for implantable medical devices, allowing data transmission by frequency modulation of a carrier signal with a carrier frequency.

BACKGROUND OF THE INVENTION

Transmission of useful signals, i.e., data such as binary-coded data, is usually performed by frequency modulation of a carrier signal by frequency shift keying (FSK). FIG. 1 schematically illustrates a standard transmitter for FSK modulation of a carrier frequency. The transmitter has a direct digital frequency synthesizer (DDFS) to perform the real part (in-phase, I) and the imaginary part (quadrature phase, Q) for a complex up-conversion of the carrier signal by means of a phase-locked loop circuit (PLL). The PLL circuit has a frequency divider which generates an output frequency from a reference frequency $f_{ref}$ (the output frequency being at a frequency higher by a factor N). Using a fractional-N synthesizer (FNS), the output frequency may also be above the reference frequency by a non-integral factor N. The phase-locked loop PLL also has a voltage-controlled high-frequency oscillator (VCO), which is regulated at a stable accurate reference phase of the reference frequency $f_{ref}$ by means of a phase comparator. The reference frequency $f_{ref}$ is supplied (for example) by a quartz oscillator (see top of FIG. 1).

As shown in FIG. 1, the output signal of the PLL is output firstly without a phase shift (real part, in-phase, I) and secondly with a 90° phase shift. The real part and the imaginary part (quadrature phase, Q) of the carrier signal are then each modulated separately (IQ modulation) and are next added to the output signal of the direct digital frequency synthesizer.

Such a circuit permits accurate and stable FSK modulation, but it has disadvantages. It requires two fast digital-analog converters (DAC) and two high-frequency (HF) mixers, and the circuit occupies substantial area, including the required tables for the sine and cosine transformation. The two digital-analog converters and the two HF mixers consume a significant portion of the total energy for operation of the transmitter, often between 15% and 20%. Furthermore, the direct digital frequency synthesizer (DDFS) also generates noise and interference signals. The circuit branches for the real part I and the imaginary part Q must be coordinated well with regard to phase and amplitude in order to suppress minor frequency signals. These last effects make it more difficult to comply with the requirements of regulatory authorities with regard to unwanted emissions by the transmitter.

Modulation by direct frequency shift keying (DFSK or direct FSK) is achieved by modifying a channel control signal of the fractional-N synthesizer (FNS), i.e., adding the modulation information directly to the basic channel, so that a binary pulse train of the useful signal to be transmitted modulates the high-frequency carrier signal directly, i.e., without an intermediate carrier. FIG. 2 illustrates a corresponding circuit.

Although this circuit avoids the problems with IQ modulation, it has its own problems. The transient response of the fractional N-synthesizer FNS interferes with the modulation pattern in a manner that cannot be reversed easily or analytically. Analog components such as the loop filter and the voltage-controlled oscillator (VCO) may not be stable over time, over variable temperatures, and/or over different production batches, and therefore also have a negative effect on the modulation pattern. The choice of FNS loop parameters is limited because a PLL loop bandwidth far below the data rate causes a Gaussian minimum shift keying (GMSK) modulation characteristic (though that may be desirable in some applications).

The basic principles for solving these problems include a large PLL bandwidth to minimize the effect of PLL dynamics; a fixed modulation gain, which inverts the calculated or estimated PLL transmission function; and a voltage-controlled oscillator (VCO) feedback to regulate the modulation gain in the manner of a closed control loop.

A large bandwidth of the functional N-synthesizer FNS, one beyond the bandwidth required for a sufficiently rapid transient response, necessitates expensive and difficult measures to maintain a low level of FNS noise and of interference signals. A fixed gain obviously cannot have any variations over time, temperature and production batches. VCO feedback fundamentally requires a type of "receiver" and demodulation circuit that includes, according to known approaches, FM demodulators which do not operate under all circumstances, and/or analog components, and/or estimates of a transmission function.

SUMMARY OF THE INVENTION

An object of the present invention is to create a transmission module with a frequency shift keying (FSK) modulator, which will make it possible to utilize the available bandwidth well, without interfering signals, and without requiring an excessively great effort.

This object can be achieved by a transmission module for transmitting data in the form of useful digital signals by modulation of a carrier signal by frequency shift keying as a function of the useful signals. The transmission module contains a PLL circuit with a voltage-controlled oscillator (VCO) and a controllable frequency divider, which has a frequency divider control input. The transmission module is designed to achieve direct frequency shift keying (DFSK) of the carrier signal by a corresponding triggering of the frequency divider with at least two different frequency divider control signals. The transmission module also has a modulation data preprocessing unit, which is connected to the frequency divider control input and is designed for weighting samples of the same polarity of the useful signals to be transmitted and fine-tuning or correcting the frequency divider control signal (the modulation index) with regard to the frequency deviation to be accomplished.

Looking to FIG. 3, the PLL circuit preferably includes a first fractional-N synthesizer (FNS) 10, preferably having a frequency divider 24, which is designed as a multi-modulus frequency divider and thus also allows non-integral multiples of the reference frequency.

This PLL circuit has a signal output 12 for output of a modulated output signal, i.e., the signal which is optionally to be amplified by amplifier 14 for sending. A calibrator circuit 40 is preferably connected to this output signal and is designed to derive weightings for samples of a useful signal to be transmitted, and correction values for the respective frequency divider control signal, from a respective modulated output signal.

To do so, the calibrator circuit 40 preferably has a test receiver 42 which is designed as an unmodulated fractional-N synthesizer (FNS) with an open control loop (open-loop fractional-N synthesizer). This test receiver 42 preferably has a frequency divider 54, which corresponds in its effect to the frequency divider 24 of the first fractional-N synthesizer 10, as well as a phase frequency detector 55, which corresponds in its effect to the phase frequency detector 26 of the first fractional-N synthesizer 10.

In addition, the calibrator circuit 40 preferably has a calibration unit 44, which is connected to an output of the test receiver 42 and is designed to form weightings for samples of a respective useful signal to be transmitted as well as forming correction values for the respective frequency signal. To do so, the calibration unit 44 may be designed so that it implements (for example) a least-mean-square (LMS) algorithm for adaptive filters.

Additional preferred versions of the invention result from rearrangement of the components discussed above, and/or of the components of the exemplary version of the invention discussed below.

DETAILED DESCRIPTION OF THE INVENTION

Figure 1:
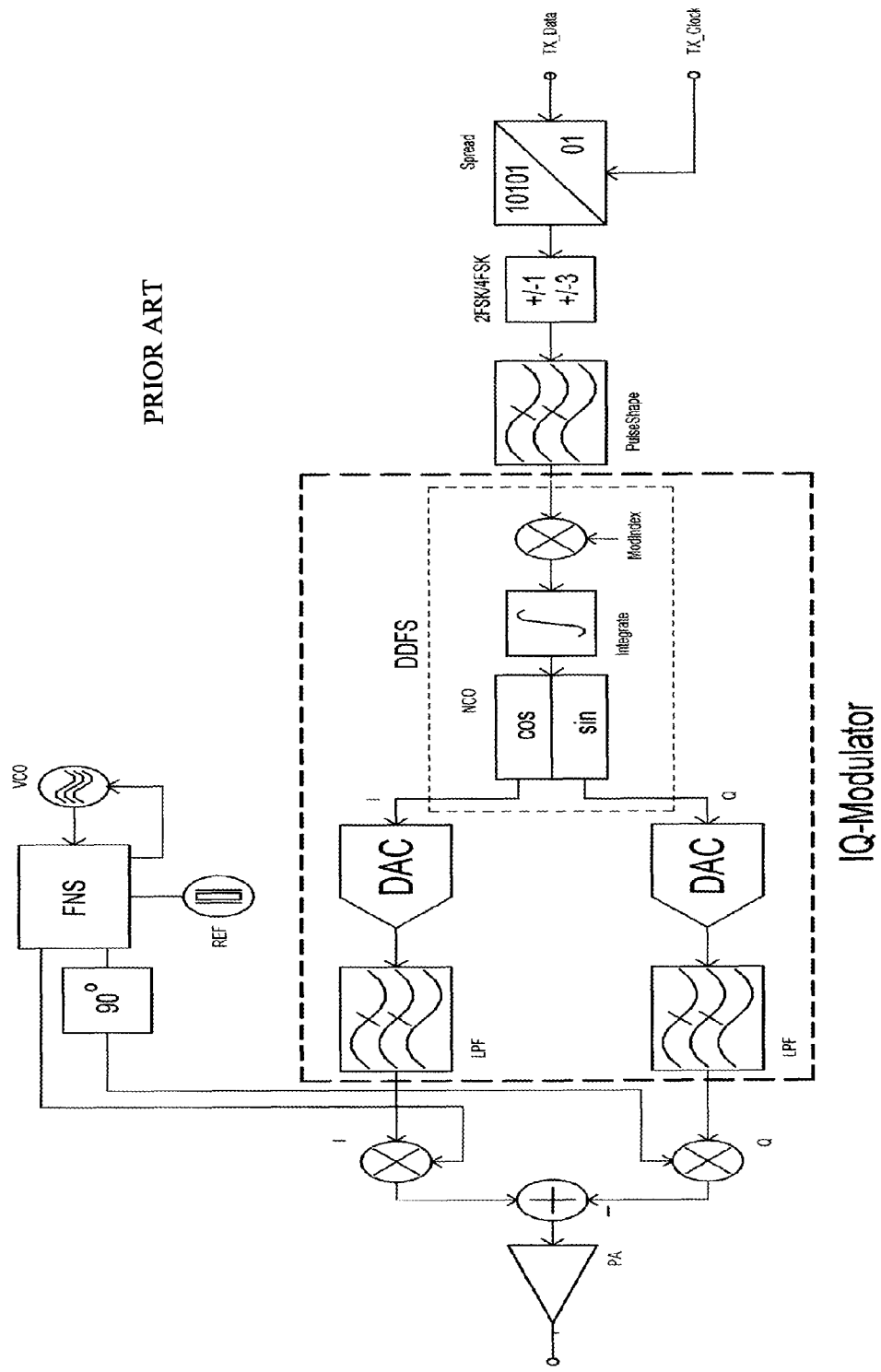
FIG. 1 shows a direct digital frequency synthesizer (DDFS) as known from the prior art.
Figure 2:
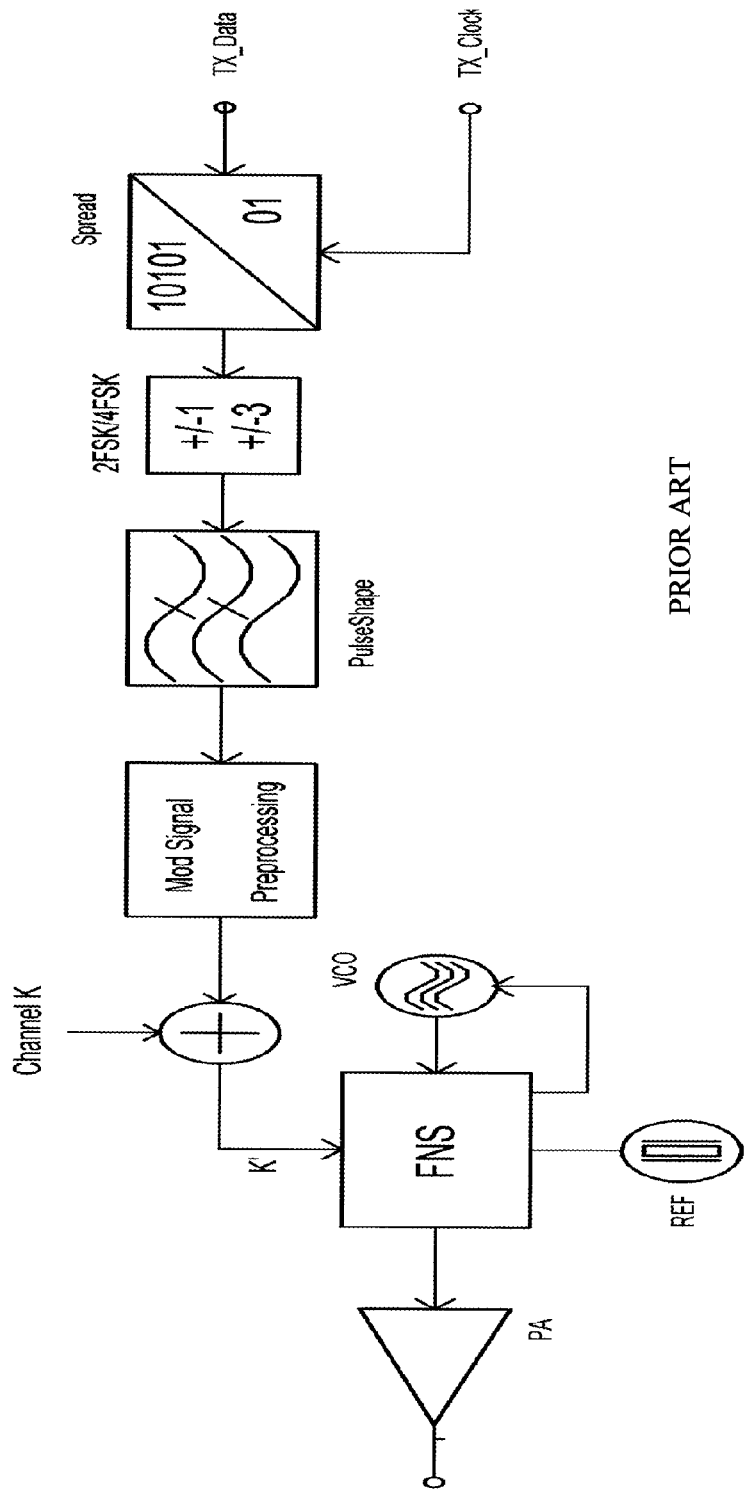
FIG. 2 shows a circuit for modulation of a carrier signal by direct frequency shift keying (DFSK) according to the prior art.
Figure 3:
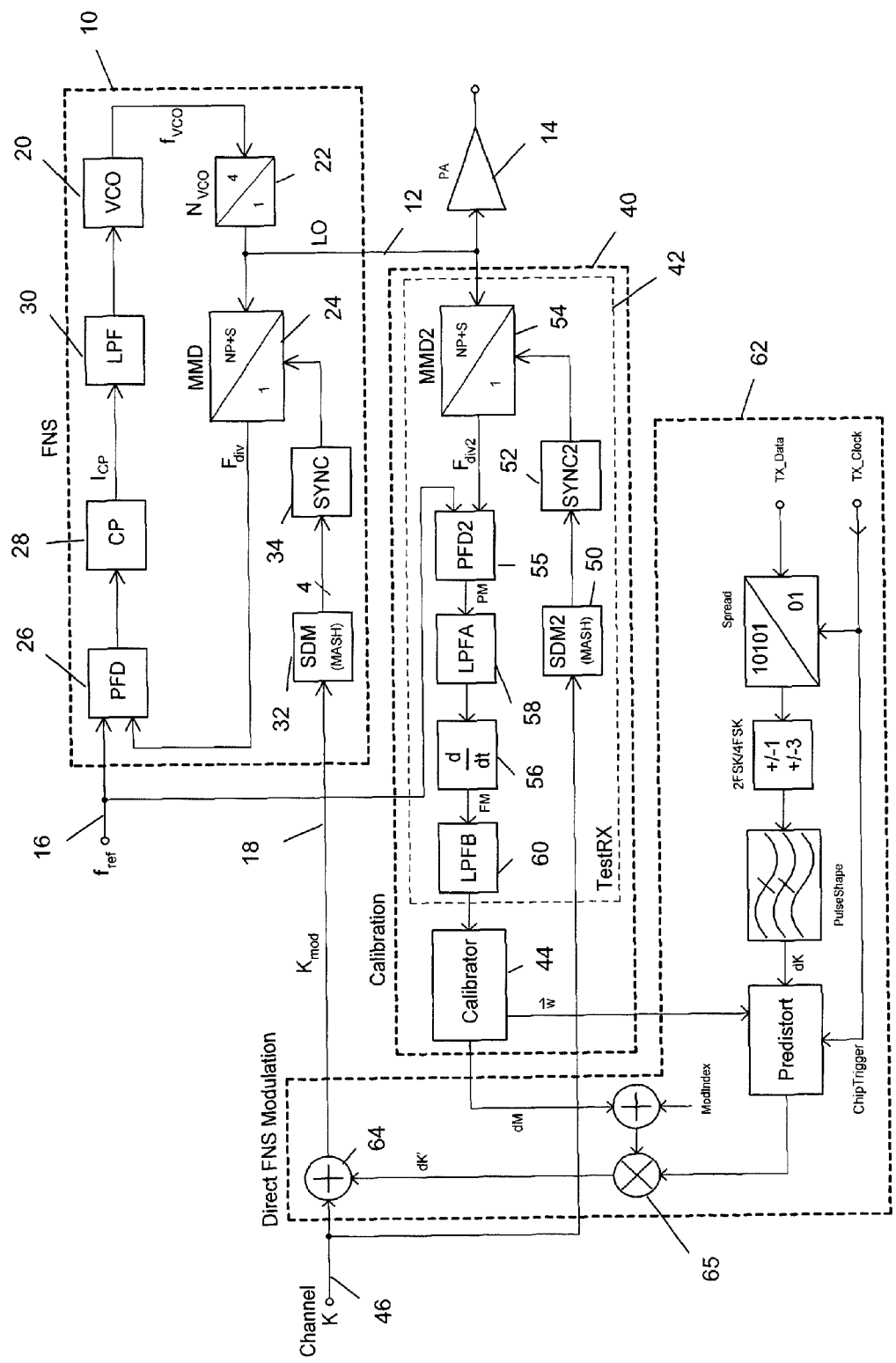
FIG. 3 shows an exemplary transmission module according to the present invention.

FIG. 3 shows a transmission module which exemplifies the invention. It has a fractional-N synthesizer FNS 10, as shown at the upper right of FIG. 3. This fractional-N synthesizer 10 has a signal output 12 for the modulated output signal, which can then be amplified by an output amplifier 14. Furthermore, the fractional-N synthesizer 10 has a first input 16 for a reference frequency $f_{ref}$ and a control input 18 for a frequency divider control signal.

In addition to the fractional-N synthesizer FNS 10, the transmission module has circuits for preprocessing the modulation data (shown below the fractional-N synthesizer FNS 10 in FIG. 3 and also described in greater detail below). These circuits compensate for the dynamic response of the fractional-N synthesizer FNS 10 and the component tolerances in two ways: a) predistortion of the modulation data (i.e., the useful signal) by weighting (scaling) the individual samples over one or more symbols (pulses) of the same polarity to smooth the transient response of the fractional-N synthesizer FNS 10, and b) a defined correction factor for the modulation index and/or the frequency deviation, which is caused by the frequency divider control signal, to control the occupied bandwidth.

The circuit shown in the middle of FIG. 3 includes a test receiver 42 and a calibration unit 44, which together determine the weighting and the correction factor for the frequency divider control signal.

The fractional-N synthesizer 10 according to FIG. 3 is a frequency synthesizer in the form of a phase-locked loop circuit (PLL circuit), and has a voltage-controlled oscillator (VCO) 20 connected to a first frequency divider $N_{VCO}$ 22, which is at a fixed setting, if the VCO is operating at a frequency higher than the desired carrier frequency. This in turn supplies an input signal for a controllable multi-modulus frequency divider MMD 24, whose output signal is sent to a phase detector (phase frequency detector PFD) 26, which is simultaneously connected to the input 16 for the reference frequency $f_{ref}$ and is designed to compare the phase angle of the output signal of the multi-modulus frequency divider MMD 24 with the phase angle of the reference frequency 16 in a known manner, and to supply a corresponding output signal. This output signal of the phase frequency detector 26 is sent in turn to the voltage-controlled oscillator VCO 20 via a charge pump CP 28 and a low-pass filter LPF 30 functioning as a loop filter.

The frequency shift keying of the fractional-N synthesizer is performed by a frequency divider control signal with which the frequency divider ratio of the multi-modulus frequency divider MMD 24 can be controlled. The frequency divider control input of the multi-modulus frequency divider MMD 24 is connected to the frequency divider control input of the multi-modulus frequency divider MMD 24 via a sigma-delta modulator 32 and a synchronizer 34. A corrected frequency divider control signal is supplied to the control input 18 of the fractional-N synthesizer 10, this control signal having been corrected by weighting the samples of the useful signal, and also being corrected by a corresponding correction factor for the frequency deviation, such that fluctuations over time, e.g., due to temperature drift, or fluctuations over different production batches are compensated.

A calibrator circuit 40 is connected at the input to the signal output of the fractional-N synthesizer 10 and has a test receiver 42 plus a calibration unit 44.

The test receiver 42 is designed as a fractional-N synthesizer with an open control loop. A channel control signal received over the channel control input 46 of the transmission module is sent via an input of the test receiver 42 to a sigma-delta modulator SDM2 50 of the test receiver 42, which generates a frequency divider control signal for a multi-modulus frequency divider MMD2 54 of the test receiver 42 by means of a synchronizer 52. This signal is not modulated, but the frequency control signal of the first multi-modulus frequency divider MMD 24 of the fractional-N synthesizer 10 is modulated according to the data to be transmitted (i.e., according to the useful signal).

A second input of the multi-modulus frequency divider MMD2 54 of the test receiver 42 is connected to the signal output 12 of the fractional-N synthesizer 10. A phase detector PFD2 55 whose output signal contains information about the phase modulation of the voltage-controlled oscillator VCO 20 of the fractional-N synthesizer 10 is connected downstream from the multi-modulus frequency divider MMD2 54 of the test receiver 42. This phase information is converted into frequency information by a digital differentiator d/dt 56. A first low-pass filter LPFA 58 is connected upstream from the digital differentiator d/dt 56 and a second low-pass filter LPFB 60 is connected downstream from it. Both of these low-pass filters 58 and 60 are first-order digital low-pass filters and suppress the interference signals originating from the sigma-delta modulators SDM 32 and SDM2 50.

In the manner described above, the test receiver 42 is a purely digital FM receiver that operates in the same manner for each channel of the fractional-N synthesizer 10 and demodulates any desired frequency deviation. The demodulated FM signal at the output of the test receiver 42 contains all the inaccuracies of direct modulation by the fractional-N synthesizer 10 and may therefore be used to calibrate this modulation. The output signal of the first low-pass filter LPFA 58 may be keyed down—e.g., by a factor of 8—to save on computation power.

The object of the test receiver 42 is frequency modulation of the output signal of the voltage-controlled oscillator VCO 20. The output signal of the voltage-controlled oscillator VCO 20 may be in the GHz range. The test receiver 42 avoids direct demodulation at such high frequencies and eliminates the need for a heterodyne receiver. Simply dividing down would lead to frequency deviations that would be difficult to detect by digital FSK demodulation and would be located in another base frequency for each channel. The transmission module presented here reduces all these problems by using the test receiver 42 presented above.

The calibration unit 44 is connected to the output of the second low-pass filter LPFB 60 of the test receiver 42. It may be designed in different ways, depending on which tolerances of the analog components are to be expected within the different production batches, or which temperature variations are to be expected, or how strictly the bandwidth is to be maintained.

In general, the calibration unit 44 may be designed to determine the weightings by means of a simplified least-mean-square algorithm (LMS algorithm) for adaptive filters, where an error dimension is calculated, e.g., the area between measured modulation signal forms and the ideal signal form, and then the weightings of the samples are varied by small increments or decrements, so that the area difference is minimal. The area difference can be determined easily by adding up the differences between the individual measured samples and the ideal samples.

Under approximately stable conditions, the calibration unit 44 may also be designed to that the weightings of the samples are fixedly programmed, e.g., in the predistortion unit 62, which will be described below, so that the maximum FM deviation need be checked only occasionally to adjust the correction factor for the frequency divider control signal (frequency modulation). Under very stable conditions, the correction value for the frequency divider control signal may be adjusted after each transmission, and the weightings of the samples can be readjusted continuously during the transmission, in which case no separate calibration cycles are required.

A preliminary determination of the weightings may be performed at the factory, e.g., for each individual transmission module, by means of integrated algorithms and/or by means of an external computer.

Furthermore, the weighting of the samples may also be performed so that it has the effect of a pulse-shaping filter and induces a Gaussian minimum shift keying (GMSK) modulation. Additional filters can be omitted in this way.

Figure 4A:
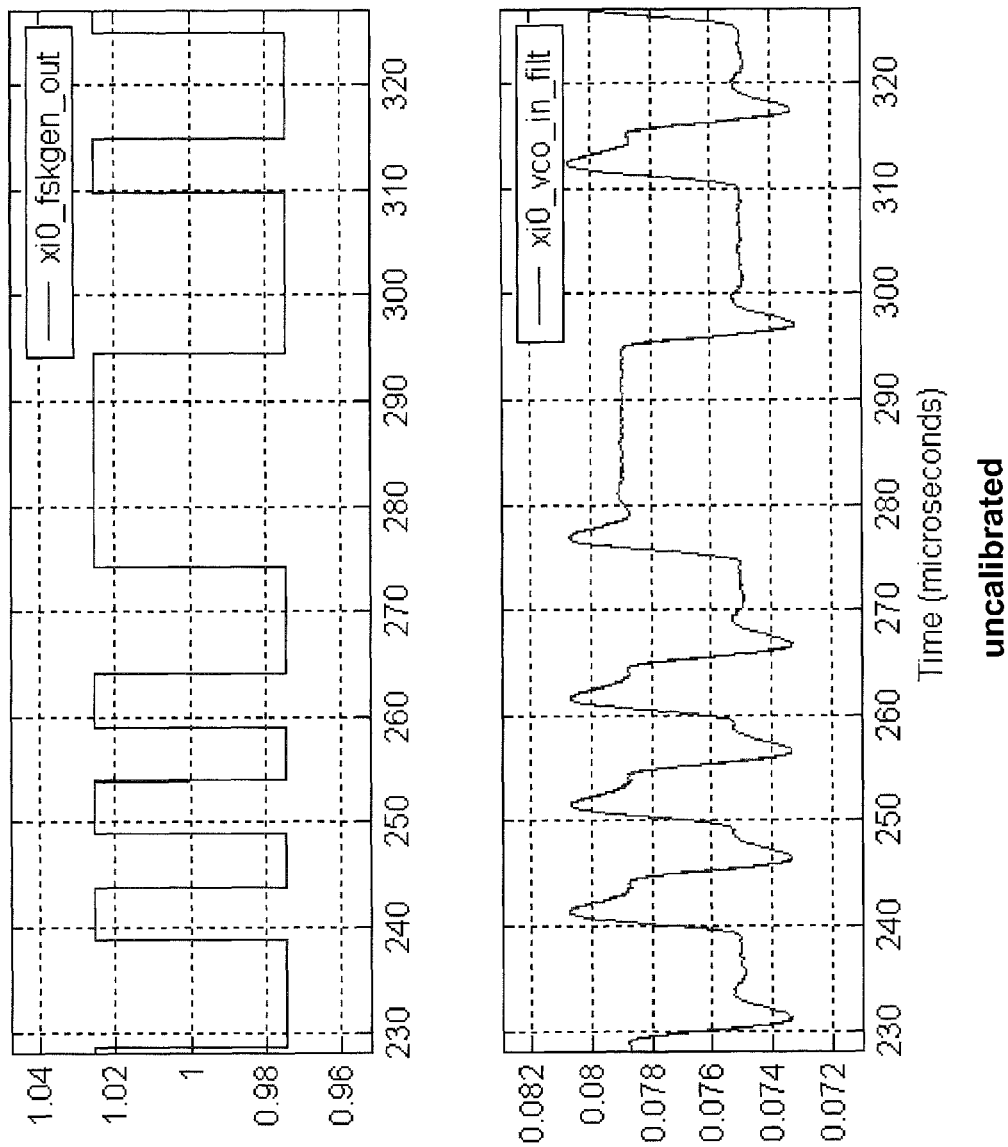
FIGS. 4a and 4b show examples of signal characteristics in the case of an uncalibrated control signal (FIG. 4a) and a calibrated control signal (FIG. 4b).
Figure 4B:
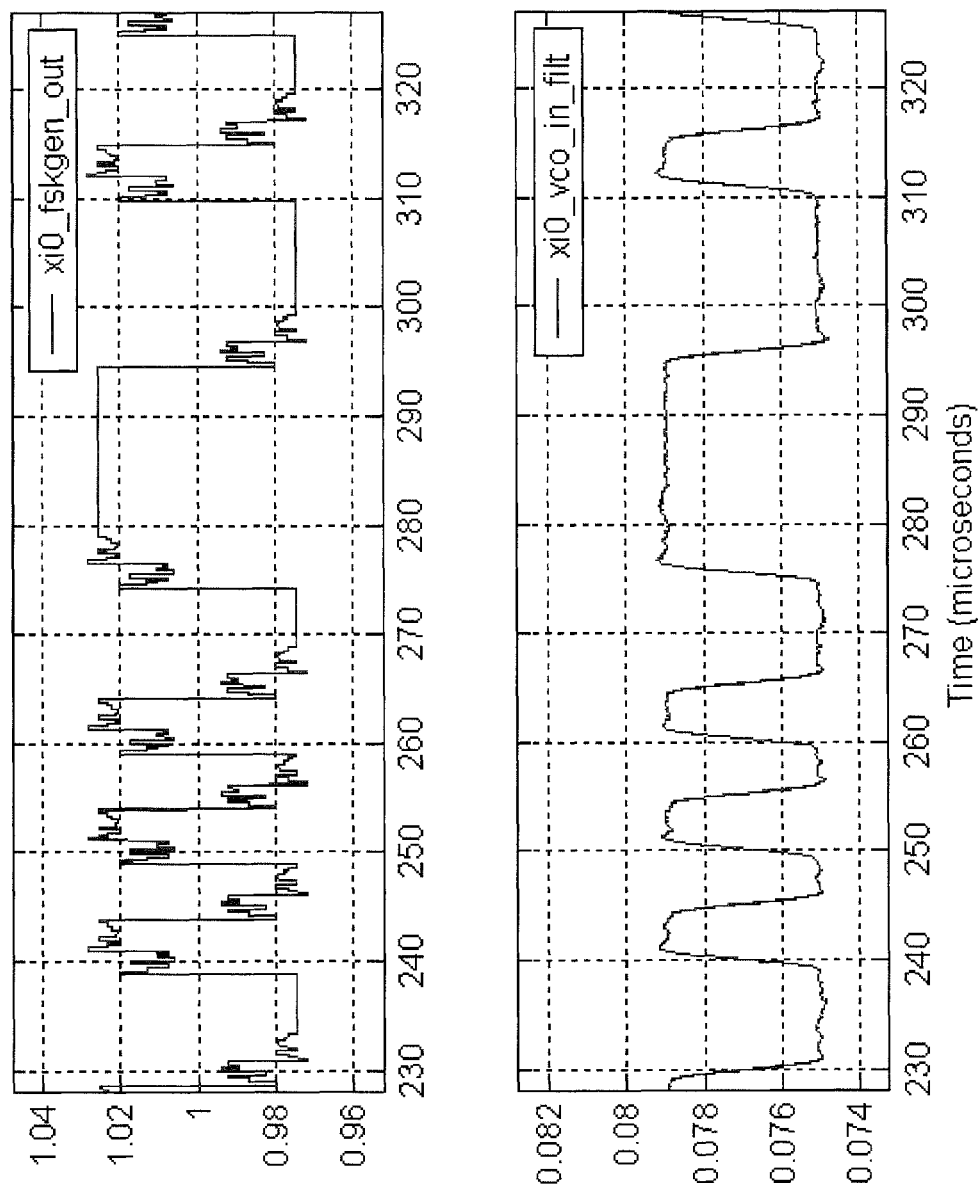

FIGS. 4a and 4b show the output signal of the transmission module once in an uncalibrated state (bottom of FIG. 4a) and once in a calibrated state (bottom of FIG. 4b). FIG. 4a shows the useful signal at the top with unweighted samples, while FIG. 4b shows the useful signal at the top with samples weighted according to the calibration. The weightings of the individual samples are scale values for the individual samples, as shown by a comparison of the top charts of FIGS. 4a and 4b.

Without calibration, i.e., with equally weighted (unscaled) samples of the useful signal, the modulated output signal of the transmission module has significant overshooting and transient response effects. After calibration and corresponding (variable) weighting of the samples of the useful signal, a sufficiently flat modulation shape of the output signal of the transmission module is obtained (see bottom of FIG. 4b).

The scaling factors for the weighting of the individual samples were determined by the calibration unit 44 in the manner described above, so the useful signals processed by a predistortion unit 62 in the manner that is otherwise customary (coding, pulse shaping) are used. Then, for example, a predistorted useful signal such as that illustrated at the top of FIG. 4b is applied at the output of the predistortion unit 62. This predistorted useful signal is then multiplied by a correction factor for the frequency deviation also determined by the calibration unit 44 using a multiplier 65 and then sent via an adder 64 to the control input 18 of the fractional-N synthesizer 10.

In contrast with other approaches, the predistortion unit 62 is neither a nonrecursive filter (finite-impulse-response filter, FIR filter) nor a recursive filter (infinite-impulse-response filter, IIR filter), each of which would require a significant computation complexity, but instead it is a simple scaling unit, for which the scaling factors of the samples (the weightings) can easily be read out of a memory. No additional arithmetic operations are required to do so.

It will be apparent to those skilled in the art that numerous modifications and variations of the foregoing exemplary versions of the invention are possible in light of the foregoing discussion. The disclosed examples are presented for purposes of illustration only. Therefore, it is the intent to cover all such modifications and alternate versions as may come within the scope of the claims below.

What is claimed is:

1. A transmission module for transmitting digital signals by modulation of a carrier, determined by the digital signals, by means of two-step or multi-step frequency shift keying, the transmission module including:
   a PLL circuit having a voltage-controlled oscillator,
   and a controllable frequency divider with a frequency divider control input,
   wherein the transmission module is configured to induce a direct frequency shift keying (DFSK) of the carrier signal by appropriate triggering of the frequency divider with at least two different frequency divider control signals,
   wherein the transmission module includes a modulation data preprocessing unit connected to the frequency divider control input, the modulation data preprocessing unit being configured to weight samples of the same polarity of the digital signals to be transmitted and to fine tune the frequency divider control signal with regard to the frequency deviation to be induced,
   wherein the PLL circuit has a signal output for output of a modulated output signal and is connected to a calibrator circuit, the calibrator circuit being configured to derive weightings for samples of a respective digital signal to be transmitted as well as correction values for the respective frequency divider control signal from a respective modulated output signal,
   wherein the calibrator circuit has a test receiver, which is configured as an unmodulated fractional-N synthesizer with an open control loop.

2. The transmission module of claim 1 wherein the PLL circuit defines a first fractional-N synthesizer.

3. The transmission module of claim 1 wherein the frequency divider is a multi-modulus frequency divider.

4. The transmission module of claim 2 wherein the test receiver has a frequency divider, which corresponds to the frequency divider of the first fractional-N synthesizer, and has a phase frequency detector which corresponds to a phase frequency detector of the first fractional-N synthesizer.

5. The transmission module of claim 1 wherein the calibrator circuit has a calibration unit, which is connected to an output of the test receiver and is configured to form weightings for samples of a respective digital signal to be transmitted and correction values for the respective frequency divider control signal.

6. The transmission module of claim 5 wherein the calibration unit is configured to determine weightings for individual samples of a respective digital signal to be transmitted by means of a simplified least-mean-square algorithm.

7. A transmission module for transmitting digital data signals by modulation of a carrier signal, the transmission module including:
 a. a phase-locked loop circuit having a voltage-controlled oscillator and a signal output for output of a digital data signal to be transmitted,
 b. a frequency divider with a frequency divider control input in communication with the voltage-controlled oscillator, the frequency divider being configured to be triggered with two or more different frequency divider control signals to induce a direct frequency shift keying (DFSK) of the carrier signal,
 c. a modulation data preprocessing unit in communication with the frequency divider control input, the modulation data preprocessing unit being configured to:
  (1) weight samples having the same polarity of the digital data signals to be transmitted, and
  (2) tune the frequency divider control signals with regard to a frequency deviation to be induced, and
 d. a calibrator circuit in communication with the phase-locked loop circuit, the calibrator circuit:
  (1) including a test receiver defined by an unmodulated fractional-N synthesizer with an open control loop, and
  (2) being configured to generate, from the digital data signal to be transmitted:
   i) weightings for samples of the digital data signal to be transmitted, and
   ii) correction values for a corresponding frequency divider control signal.

8. The transmission module of claim 7 wherein the phase-locked loop circuit defines a first fractional-N synthesizer.

9. The transmission module of claim 7 wherein the frequency divider is a multi-modulus frequency divider.

10. The transmission module of claim 7 wherein the calibrator circuit includes a calibration unit:
 a. in communication with an output of the test receiver, and
 b. configured to generate:
  (1) weightings for samples of a digital data signal to be transmitted, and
  (2) correction values for a corresponding frequency divider control signal.

11. The transmission module of claim 10 wherein the calibration unit is configured to determine weightings for samples of a digital data signal to be transmitted by means of a simplified least-mean-square algorithm.

12. The transmission module of claim 7 wherein the test receiver includes a frequency divider and a phase frequency detector.

13. A transmission module for transmitting digital data signals by modulation of a carrier signal, the transmission module including:
 a. a phase-locked loop circuit having:
  (1) a voltage-controlled oscillator; and
  (2) a signal output for output of a digital data signal to be transmitted;
 b. a frequency divider with a frequency divider control input in communication with the voltage-controlled oscillator, the frequency divider being configured to be triggered with two or more different frequency divider control signals to induce a direct frequency shift keying (DFSK) of the carrier signal; and
 c. a modulation data preprocessing unit in communication with the frequency divider, the modulation data preprocessing unit having a calibrator circuit, wherein the calibrator circuit includes a test receiver having an unmodulated fractional-N synthesizer with an open control loop.

14. The transmission module of claim 13 wherein the modulation data preprocessing unit being configured to:
 a. weight samples having the same polarity of the digital data signals to be transmitted; and
 b. tune the frequency divider control signals with regard to a frequency deviation to be induced.

15. The transmission module of claim 13 wherein the calibrator circuit is configured to generate, from the digital data signal to be transmitted, weightings for samples of the digital data signal to be transmitted.

16. The transmission module of claim 13 wherein the calibrator circuit is configured to generate correction values for a corresponding frequency divider control signal from the digital data signal to be transmitted.

17. The transmission module of claim 13 wherein the calibrator circuit includes a calibration unit:
 a. in communication with an output of the test receiver; and
 b. configured to generate:
  (1) weightings for samples of a digital data signal to be transmitted; and
  (2) correction values for a corresponding frequency divider control signal.

18. The transmission module of claim 13 wherein:
 a. the test receiver includes a sigma-delta modulator and a multi-modulus frequency divider; and
 b. the sigma-delta modulator is configured to generate a frequency divider control signal for the multi-modulus frequency divider using a synchronizer.

\* \* \* \* \*